US008216644B2

(12) United States Patent
Porterfield et al.

(10) Patent No.: US 8,216,644 B2
(45) Date of Patent: Jul. 10, 2012

(54) CONTROLLING WOOD STAINING AND COLOR DURING POST-HARVEST PROCESSING

(75) Inventors: David Marshall Porterfield, West Lafayette, IN (US); Daniel L. Cassens, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 981 days.

(21) Appl. No.: 11/982,600

(22) Filed: Nov. 2, 2007

(65) Prior Publication Data

US 2008/0220171 A1 Sep. 11, 2008

Related U.S. Application Data

(60) Provisional application No. 60/856,148, filed on Nov. 2, 2006.

(51) Int. Cl.
  *B05D 3/12* (2006.01)
  *B05D 3/02* (2006.01)
  *B05D 1/36* (2006.01)
  *B05D 7/00* (2006.01)
  *B05D 1/18* (2006.01)
(52) U.S. Cl. .............. 427/291; 427/430.1; 427/440; 427/393; 427/397; 427/408
(58) Field of Classification Search .............. None
See application file for complete search history.

(56) References Cited

U.S. PATENT DOCUMENTS

| 3,645,666 | A | | 2/1972 | Bailey et al. |
| 3,795,574 | A | | 3/1974 | Kalisch et al. |
| 4,313,976 | A | * | 2/1982 | Leach ............................ 427/297 |
| 4,871,423 | A | * | 10/1989 | Grimsley et al. ................ 162/72 |
| 4,888,403 | A | | 12/1989 | Ueda et al. |
| 5,190,791 | A | | 3/1993 | Gunter et al. |
| 6,045,865 | A | | 4/2000 | Felby et al. |
| 6,905,520 | B2 | | 6/2005 | Auger |
| 2002/0004951 | A1 | * | 1/2002 | Auger .......................... 8/115.51 |
| 2003/0017565 | A1 | | 1/2003 | Echigo et al. |

(Continued)

FOREIGN PATENT DOCUMENTS

GB 1027221 1/1969

(Continued)

OTHER PUBLICATIONS

Burtin et al., "Natural wood colouring process in *Junglas* sp. (*J. nigra, J. regia* and hybrid *J. nigra* 23 x *J. regia*) depends on native phenolic compounds accumulated in the transition zone between sapwood and heartwood," Trees (1998) 12:258-264.

(Continued)

*Primary Examiner* — Kelly M Gambetta
(74) *Attorney, Agent, or Firm* — John V. Daniluck; Cedric A. D'Hue; Bingham Greenebaum Doll LLP

(57) ABSTRACT

Methods of darkening and preserving wood, including cut wood, are described herein. The methods comprise treating wood, including cut wood, with a solution containing a cell signaling agent to darken wood. Also described herein are methods for preserving the color of wood comprise treating wood, including cut wood, with a solution containing a cell signaling agent inhibitor. Wood, including cut wood, prepared by such methods are further described herein.

30 Claims, 10 Drawing Sheets
(6 of 10 Drawing Sheet(s) Filed in Color)

U.S. PATENT DOCUMENTS

2004/0244871 A1    12/2004    Chung

FOREIGN PATENT DOCUMENTS

| RU | 2194613 C1 * | 12/2002 |
|---|---|---|
| WO | 8504668 | 10/1985 |
| WO | 8607081 | 12/1986 |
| WO | 2007051741 | 5/2007 |

OTHER PUBLICATIONS

Brauner, A.B., Connway, E. M. (1964), "Steaming Walnut for Color," Forest Products Journal: 425-427.

Brauner, A.B., Loos, W.E. (1968), "Color Changes in Black Walnut as a Function of Temperature, Time, and Two Moisture Conditions," Forest Products Journal 18(8):29-34.

Chen, P.Y.S. (1975), "The Effect of Steaming Time and Temperature on the Longitudinal Permeability of Black Walnut," Wood and Fiber 7(3):222-225.

Chen, P.Y.S., Workman Jr., Edward C., (1980), "Effect of Steaming on Some Physical and Chemical Properties of Black Walnut Heartwood," Wood and Fiber: 218-227.

Mazt, Decarreau & Hofmann, "Influence of wood anatomy and structure on the appearance and natural colour of forest products, particularly artificially coloured wood," Forest Products Abstracts (1F vol. 014 aBS. No. 00705), 1988, pp. 253-260.

QiAng; MinRen; Huixin; HuoGen and WeiZhong, "Study on chemical characteristics and formation mechanism of popular wet heartwood," Scientia Silvae Sinicae, vol. 33, No. 3, 1997, pp. 259-266.

Deliiski, "Automatic control of the convective drying process of beech lumber in chambers with preservation or an allowable modification in its natural color," Annals of Warsaw Agricultural Univeristy, Forestry and Wood Technology, No. 53, 2003, pp. 42-46.

* cited by examiner

CONTROLLING WOOD STAINING AND COLOR DURING POST-HARVEST PROCESSING

CROSS REFERENCE TO RELATED APPLICATIONS

The present invention claims the benefit of priority to U.S. Provisional Patent Application Ser. No. 60/856,148, filed Nov. 2, 2006, which is incorporated herein by reference.

FIELD OF THE INVENTION

Various embodiments of the present invention pertain to methods for controlling the color of wood, and in particular for the application of compounds that darken the wood and also of other compounds that inhibit the darkening of the wood.

BACKGROUND OF THE INVENTION

In the wood industry, it is desirable to have woods that are of a dark color or to substantially preserve the color of white woods. With respect to dark woods, for example, dark wood veneers are particularly valued in a number of different applications including furniture, architectural woodwork, flooring, paneling, plywood, cabinets, novelties, caskets, toys, and musical instruments.

Of the wood veneers produced, black walnut (*Juglans nigra* L.) has one of the highest market values, due to its relative scarcity and highly aesthetic dark, rich color. The cost of handling black walnut and processing it to obtain the highly prized dark color is high. In order to obtain the desired color, cut walnut trees have to be maintained wet, then steamed or cooked for long periods of time in order to soften the walnut for cutting, as well as to facilitate the process of color darkening in the wood itself. Further, black walnut must undergo further manipulation in the manufacturing process in order to achieve full dark color. Once cut, the sliced veneers are set aside for 24-48 hours after cutting, and maintained in a wet condition, for the final darkening of the wood to occur. Care must be taken when handling the wood. For instance, walnut that is taken straight from cutting into an oven for drying does not darken and is fixed into its native green state. Compared to other woods, that do not need substantial processing and handling, preparing black walnut is costly due to the added processing steps.

A great deal of research has been aimed at physically treating black walnut logs to obtain a dark, rich color, thereby minimizing or optimizing the expensive procedures that are used. In general researchers have approached the problem in terms of materials processing, and have focused on physiochemical approaches to change the walnut by cooking it. Brauner, A. B., Connway, E. M. (1964), "Steaming Walnut for Color," Forest Products Journal: 425-427; Brauner, A. B., Loos, W. E. (1968), "Color Changes in Black Walnut as a Function of Temperature, Time, and Two Moisture Conditions," Forest Products Journal 18(8): 29-34; Chen, P. Y. S. (1975), "The Effect of Steaming Time and Temperature on the Longitudinal Permeability of Black Walnut," Wood and Fiber 7(3): 222-225; and Chen, P. Y. S., Workman, E. C. (1980), "Effect of Steaming on Some Physical and Chemical Properties of Black Walnut Heartwood," Wood and Fiber: 218-227. The results of this research have been the acceptance and adaptation of physical processing schemes that are currently used to modulate color of black walnut during processing. This includes controlled environment storage, long term cooking of whole logs in large scale vats, and delayed multistage handling schemes to promote final stages of color maturation. None of these studies approached the problem based on the analysis of a biological/biochemical system.

Approaches taking advantage of biochemical and molecular mechanisms include techniques to control fruit ripening and mediate damage responses in cut flowers and other vegetables. Since the 1950s, the control of post-harvest physiology in fruits, vegetables, and cut flowers using such techniques that take advantage of intrinsic biochemical signaling systems in plants has revolutionized that industry. For example, during shipment of green bananas ripening is inhibited by cold temperatures. Once in the mark the ripening process is "switched on" by treatment with the plant hormone ethylene.

More specifically, in herbaceous plants there has been a large amount of research on responses to herbivore, pathogens, and abiotic stress. Secondary plant compounds, those not known to be needed for basic metabolism of the plant, are now an important and growing area of research. Research has shown that there are complex interactions between chemicals metabolized by the plants, insect herbivores, parasitoids of herbivores, and plant pathogens. For example, it has been shown that chemical pathways are induced in plants in response to attack by insect herbivores and pathogens. The physical damage to the plant tissue induces a signaling response that leads to the production and activation of compounds such as proteinase inhibitors, polyphenol oxidase and steroid glycoalkaloids that appear to contribute to plant resistance against many insect attackers and some pathogens. This understanding has led to an expanding awareness of the importance of biological mechanisms to control plant pests in crop systems to enhance agricultural productivity.

To date, despite over 50 years of work with plants, these biochemical techniques and mechanisms have not been applied to wood. Various embodiments of the inventions described here provide novel and unobvious ways to modify the color of wood.

SUMMARY OF THE INVENTION

One embodiment of the currently invention includes a method for darkening the color of wood which includes treating a surface of cut wood with a cell signaling agent in an amount effective to darken the color of the wood.

Another embodiment of the current invention includes a method for preserving the color of wood which includes treating a surface of wood with an inhibitor in an amount effective to discourage signaling by cell agents that darken the color of the wood.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these myriad combinations is excessive and unnecessary.

These and other features and aspects of different embodiments of the present invention will be apparent from the claims, specification, and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures are photographs which illustrate the examples. Both black and white and color photographs have been used to illustrate the examples.

DESCRIPTION OF THE PREFERRED EMBODIMENT

Figure 1:
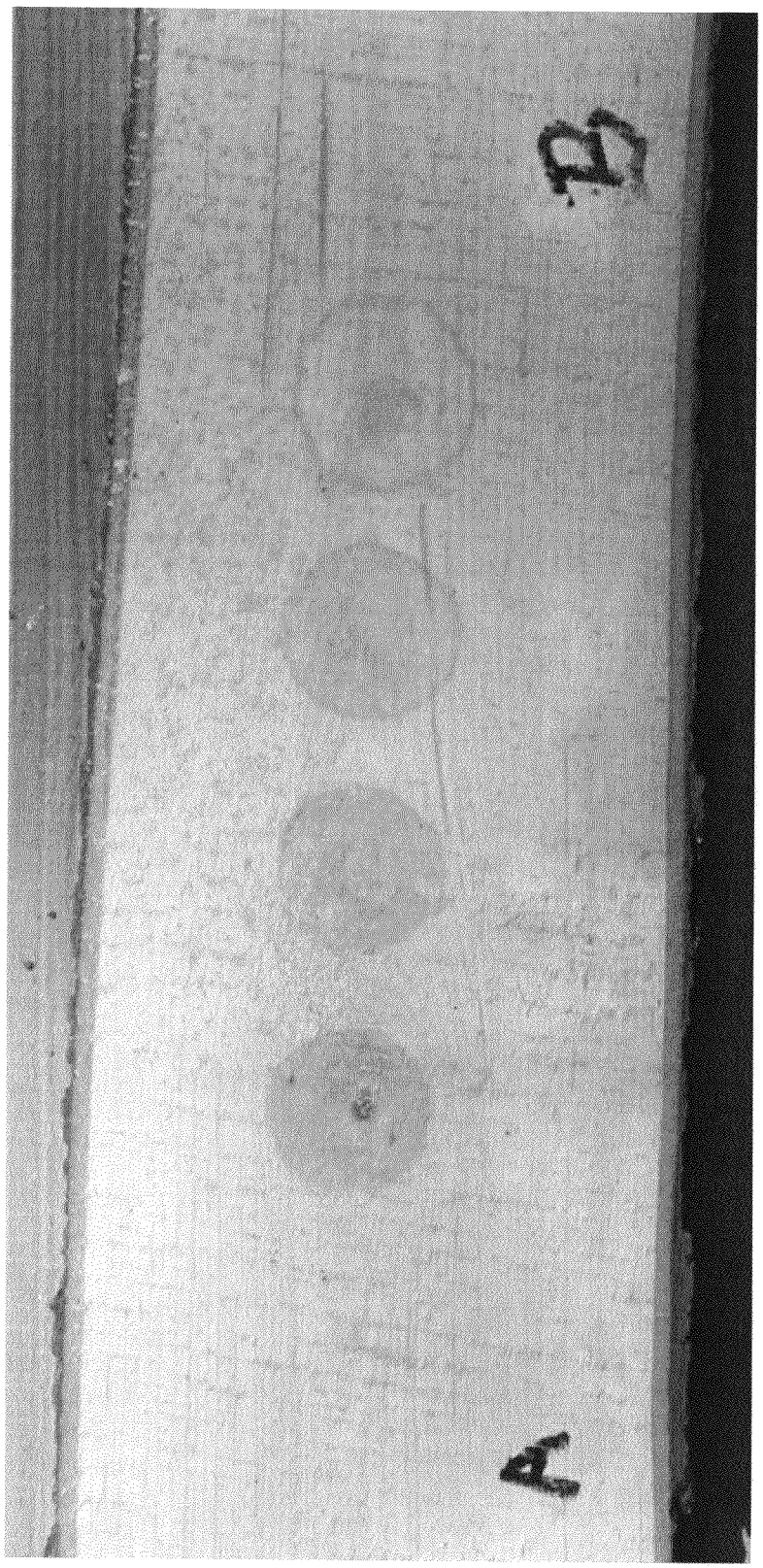
FIG. 1 is a color photograph showing test solutions according to various embodiments of the present invention on sugar maple.
Figure 1A:
FIG. 1A is a black and white version of the photograph of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

While not being bound by theory, it is believed that color development in woods, including black walnut, occurs during the natural process of heartwood maturation, based upon the bio-oxidation of phenolics and other juglans present in the secondary cell walls of the xylem. Thus, the darkening of wood is believed to be the result of a biochemical/molecular mechanism. The complex secondary compounds resulting from the bio-oxidation of phenolics and other juglans are responsible for imparting resistance to bacteria, fungi, and wood boring insects by the wood. In other words, this is part of the defensive response system in the wood. When the wood is cut, the enzyme systems that are in place in xylem parenchyma cells are activated through an intrinsic cellular signaling system. These active enzymes then mediate final activation of resistance biochemistry that is observable in the form of color maturation. The cellular signaling system uses oxides as the cell signaling agent to cause a cascade of events which results in the wood generating compounds that darken the wood as a defensive response to the cutting. The rate at which wood darkens naturally, however, in response to being cut, is too slow to rapidly impart darkening. One advantage of the invention described herein is that it provides for a rapid darkening of cut wood without expensive and time consuming processing. Indeed, several specific embodiments of the invention described herein illustrate that cut wood treated according to the invention reaches the desired darkening within 5 to 10 minutes.

It is further believed that inhibition of the bio-oxidation of phenolics may substantially preserve the color of white woods. Such inhibition may occur with the use of an antioxidant.

Various embodiments of the present invention described herein includes methods for darkening the color of cut wood wherein the cut wood is treated with a solution containing a cell signaling agent. The solution is left in contact with the wood for sufficient time so as to darken the color of the cut wood to the desired color.

Yet other embodiments of the present invention described herein further includes cut wood treated by the methods of the invention.

Yet other embodiments of the present invention described herein additionally includes methods for substantially preserving the color of white cut woods wherein the cut wood is treated with a solution containing a cell signaling agent inhibitor. The solution is left in contact with the wood for sufficient time so as to limit natural color darkening.

In one embodiment, the present invention is related to methods for treating cut wood or trees pre-selected for cutting and processing, with a solution containing a cell-signaling agent. Cut wood, such as freshly cut logs, is wood that has been obtained from trees which has thereafter been processed to expose a surface. For purposes of the invention, cut wood means any wood whereby a surface has been exposed whether by cutting, sawing, peeling, slicing, stripping or any other method for processing wood from trees to obtain an exposed surface. Examples of cut woods of the invention include both hardwoods and softwoods. A hardwood is any of the species within the phylum Anthophyta (Angiosperms) that produces secondary xylem. The largest and most prominent taxon within the Anthophyta is the eudicots (formally the dicots) as this group includes species like walnut, cherry oak, mahogany, sycamore, hickory, maple, cherry, apple and poplar. The Anthophyta also include others species that produce wood and other woody structures as a result of secondary xylem production, that are harvested and used commercially including the woody magniliids, as well as some monocots such as bamboo for example. A softwood is any member of the phylum Coniferophyta whose growth produces secondary xylem including all species of pine, cedar, redwood, and cypress.

An alternative approach, that to date has not been attempted in woods, is to consider the wood as a biological system and investigate the biochemical/molecular mechanisms associated with wood darkening in woods such as black walnut or in substantially preserving the color of white woods including those found in Table 1.

TABLE 1

| Species | Scientific Name |
| --- | --- |
| All maples and especially | Acer sp. and especially |
| Hard maple | Acer saccharum Marsh. |
| Hackberry | Celtis occidentalis L. |
| Sugarberry | Celtis laevigata wild. |
| All Ashes | Fraxinus sp. |
| All Hickories and Pecans | Carya sp. |
| Yellow Poplar | Liriodendron tulipifera L. |
| All Basswoods | Tilia sp. |
| Beech | Fagus grandifolia Ehrh. |
| All Cottonwoods and Aspens | Populus L. |
| All Elms except Red Elm | Elmus sp. except Elmus rubra Muhl. |

TABLE 1-continued

| Species | Scientific Name |
| --- | --- |
| Red and White Oak Sapwood | *Quercus* sp. |
| Sycamore | *Platanus occidentalis* L. |
| Sweetgum | *Liquidambar styraciflua* L. |
| Black Gum and Tupelo Gum | *Nyssa* sp. |
| Magnolia | *Magnolia* sp. |
| Alder | *Alnus rubra* Bong. |
| All Buckeyes | *Aesculus* sp. |
| All Birches | *Betula* sp. |
| Persimmon | *Diospyros virginiana* L. |
| Dogwood | *Cornus florida* L. |
| Holly | *Ilex opaca* Ait. |

The surface of the cut wood may be treated with a solution containing a cell-signaling agent by one of several methods. For example, the solution may be applied directly onto the cut wood. In other embodiments of the invention, the solution may be applied by treating the cut wood with a material that contains the cell signaling agent. For example, in one embodiment, a filter paper treated with a solution containing a cell signaling agent may be used to treat the cut wood. Any material wherein the solution containing the cell signaling agent ultimately contacts the exposed surface of the cut wood may be used to treat the cut wood and such materials will be readily understood and identifiable by those of ordinary skill in the art.

Trees pre-selected for cutting and processing may be treated prior to cutting by, for example, injecting a solution containing a cell signaling agent into the wood.

By "cell signaling agent" what is meant is a compound which acts to mediate cell signals in wood. Examples of such compounds and include compounds containing a reactive oxygen species. By a "reactive oxygen species" what is meant is a free radical molecule containing oxygen that possesses one or more unpaired electrons, and thereby imparts chemical reactivity. At low levels, these species may function in cell signaling processes, but at higher levels, these species may damage cellular macromolecules. A non-limiting list of examples of reactive oxygen species includes molecular oxygen ($O_2$), hydrogen peroxide (peroxide), superoxide anion, hydroxyl radical, hydroxyl ion, singlet oxygen, nitric oxide, and peroxynitrite. Compounds containing reactive oxygen species may be combined with additional compounds for use in some embodiments of the invention. For example, hydrogen peroxide may be used as a cell signaling agent as a urea adduct. Other non-limiting examples of combination compounds containing or producing reactive oxygen species include calcium peroxide and menadione, or any of the nitric oxide donors including sodium nitropruside, S-nitrosoN-acetylpenicillamine, nitroglycerine, and any of the nonoates.

The cell signaling agent may be placed in any suitable solvent to form a solution of the disclosure. A typical suitable solvent is water. Solution concentrations include about 0.05% to about 1% by weight and further include about 1% to about 10% by weight. Any solution concentration that darkens cut wood may be used in accordance with some embodiments of the invention.

Once the solution is placed in contact with any exposed surface of the cut wood, the exposed surface of the cut wood changes color. The rate and extent to which color changes occur can be altered by varying the amount of time the solution containing the cell signaling agent is placed in contact with the wood, the concentration of the solution, or both. In several embodiments discussed herein, for example, color changes to the desired darkened color occurred in about five to ten minutes. However, the other embodiments of the present invention contemplate exposure duriations of both longer and shorter that result in coloring of the wood without damaging the wood cells. As one example, one embodiment contemplates applying a cell signaling agent for a period of sixty minutes.

In several such embodiments, seen in FIGS. 1-4 and FIGS. 1A-4A, the presence of a cell signaling agent solution on cut wood led to visible darkening of the wood. The concentration ranges used in the figure illustrate darkening which is biochemically induced by signaling.

EXAMPLES

Basic Experimental Protocols

A test strip assay was used to apply various test solutions to the surface of freshly cut wood. The strips were made by cutting Plexiglas strips and affixing 5 circular (1 inch diameter) pieces of Whatman filter paper to the Plexiglas support. Control solution (dH20) and four test solutions (hydrogen peroxide urea adduct: $CH_4N_2O*H_2O_2$, Fluka) were applied to the sets strip before it was placed onto the cut wood surface. The test areas were incubated for 5-10 minutes before the strips were removed and pictures taken with a digital camera. In some cases experimental solutions were applied directly to the wood surface. Test solutions that ranged from 1-10% (w:w) and 0.05-1% (w:w) were used. Tests were performed under ambient conditions in a laboratory.

FIG. 1 shows a photograph of a section of freshly cut sugar maple wood. Four test strip applications were applied to the sample. The four test strips had concentrations, from left to right, 0, 0.5, 1.0, 5.0 and 10% (w:w) $CH_4N_2O*H_2O_2$. Note that the control spot (deionized water) shows no staining. The reaction appears saturated in the 0.5-1.0% range and 10% shows chemical breakdown of the staining due to bulk oxidation.

Figure 2:
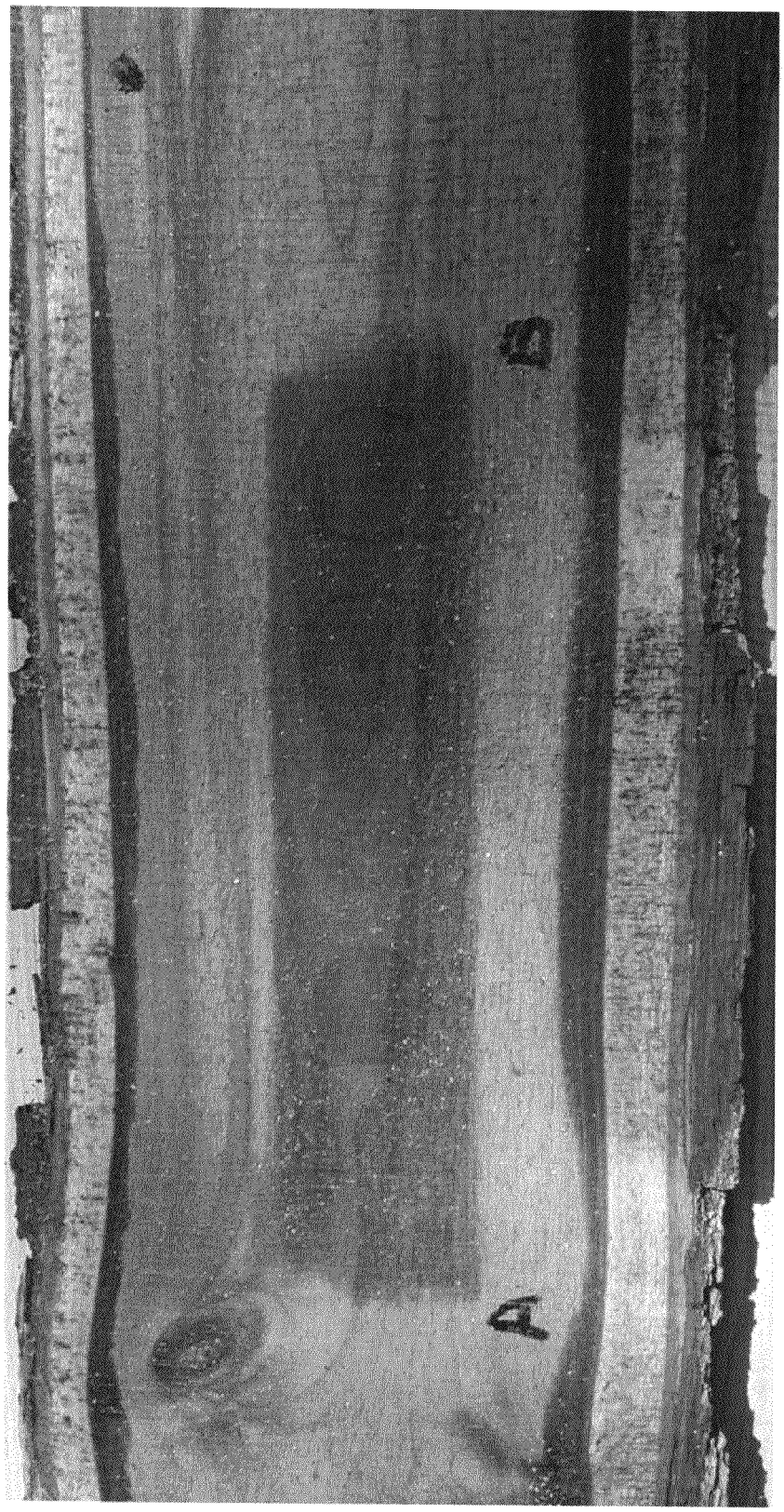
FIG. 2 is a color photograph showing test solutions according to other embodiments of the present invention on black walnut.
Figure 2A:
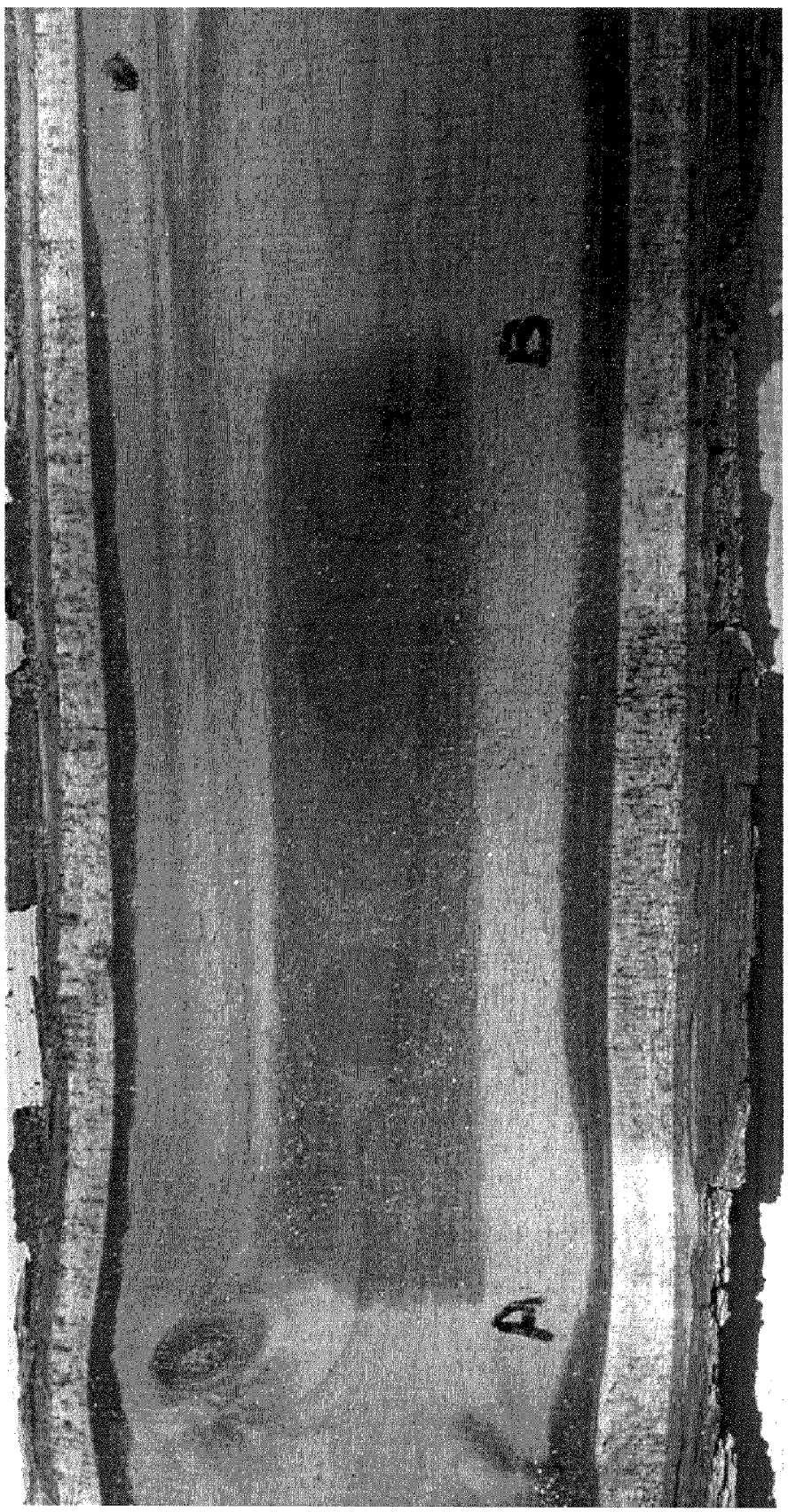
FIG. 2A is a black and white version of the photograph of FIG. 2.

FIG. 2 shows a photograph of a section of freshly cut black walnut wood. Four test strip applications were applied to the sample. The four test strips had concentrations, from left to right, 0, 0.5, 1.0, 5.0 and 10% (w:w) $CH_4N_2O*H_2O_2$. Note that the control spot (deionized water) is not visible over the background. The experimental spots are visible on top of the background staining. It is possible that the background is caused by propagation and spread of bio-oxidation initiated by the biochemical signaling system in the wood.

Figure 3:
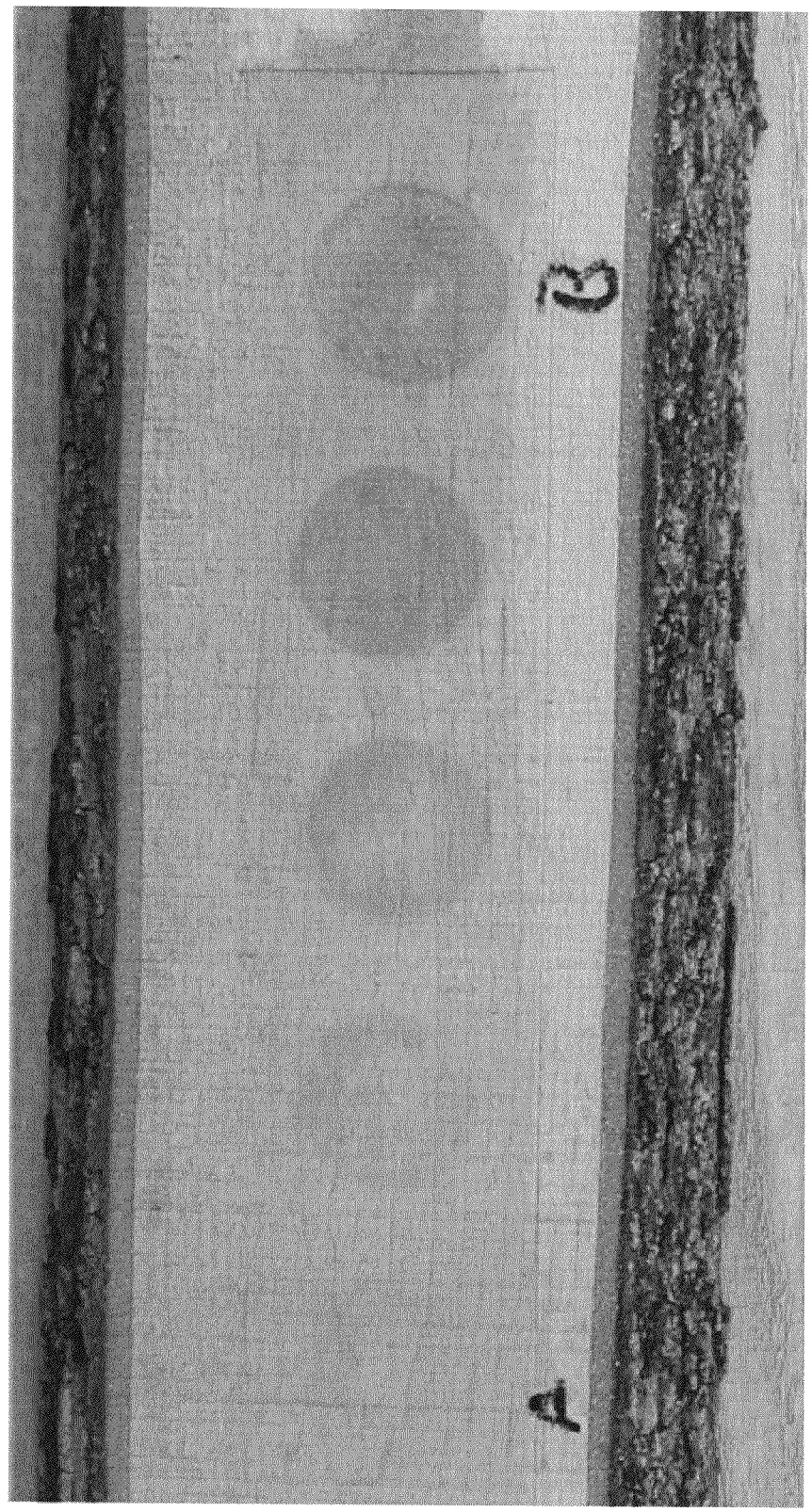
FIG. 3 is a color photograph showing test solutions according to other embodiments of the present invention on sugar maple.

FIG. 3 shows a photograph of a section of freshly cut sugar maple wood. Four test strip applications were applied to the sample. The four test strips had concentrations, from left to right, 0, 0.05, 0.1, 0.5 and 1.0% (w:w) $CH_4N_2O*H_2O_2$. Note that the control spot (deionized water) shows no staining. The reaction shows a dose response curve in this concentration range. The concentration range indicates that this reaction is biochemically induced by signaling, and is not a bulk chemical reaction.

Figure 4:
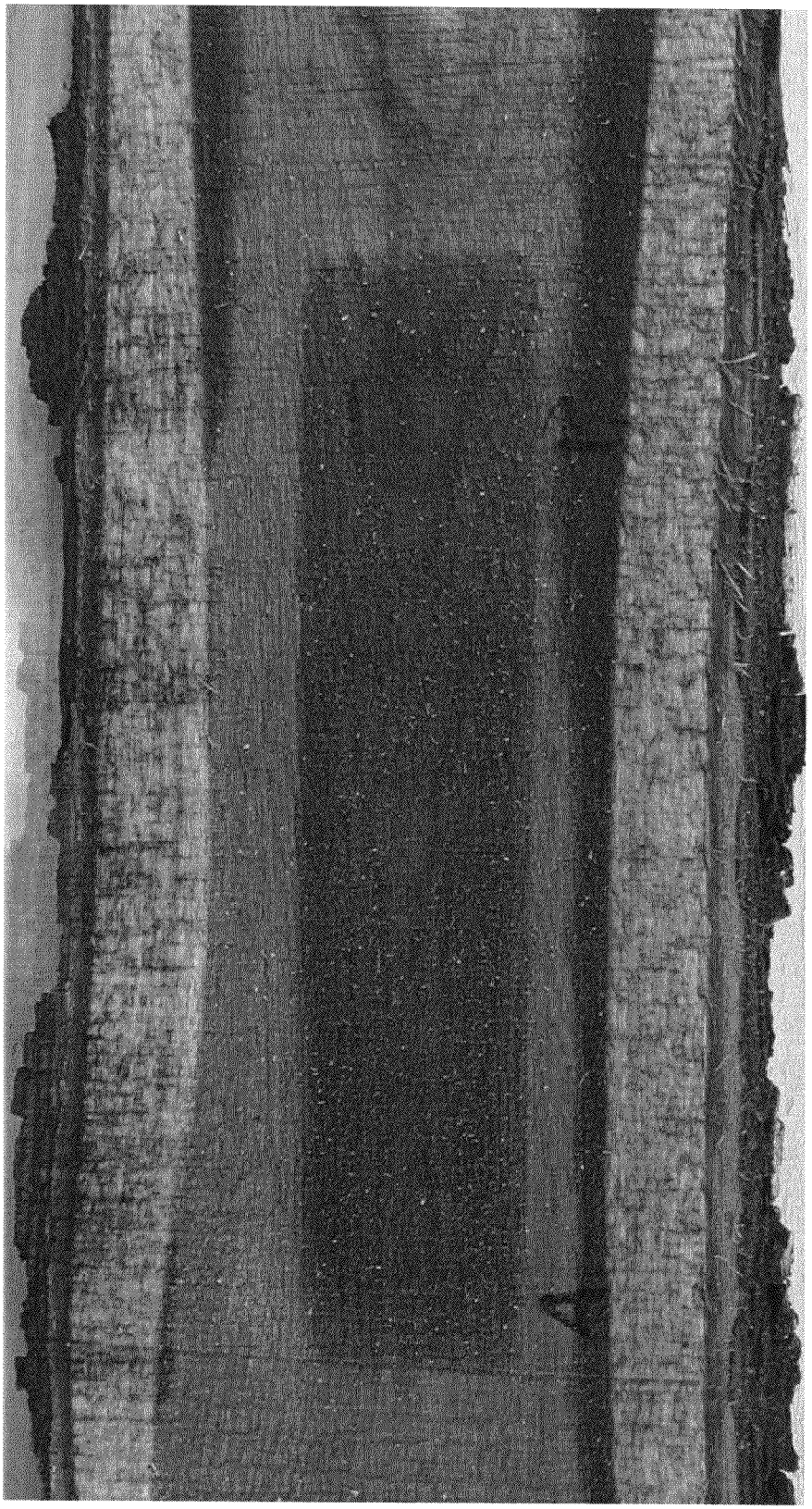
FIG. 4 is a color photograph showing test solutions according to other embodiments of the present invention on black walnut.
Figure 4A:
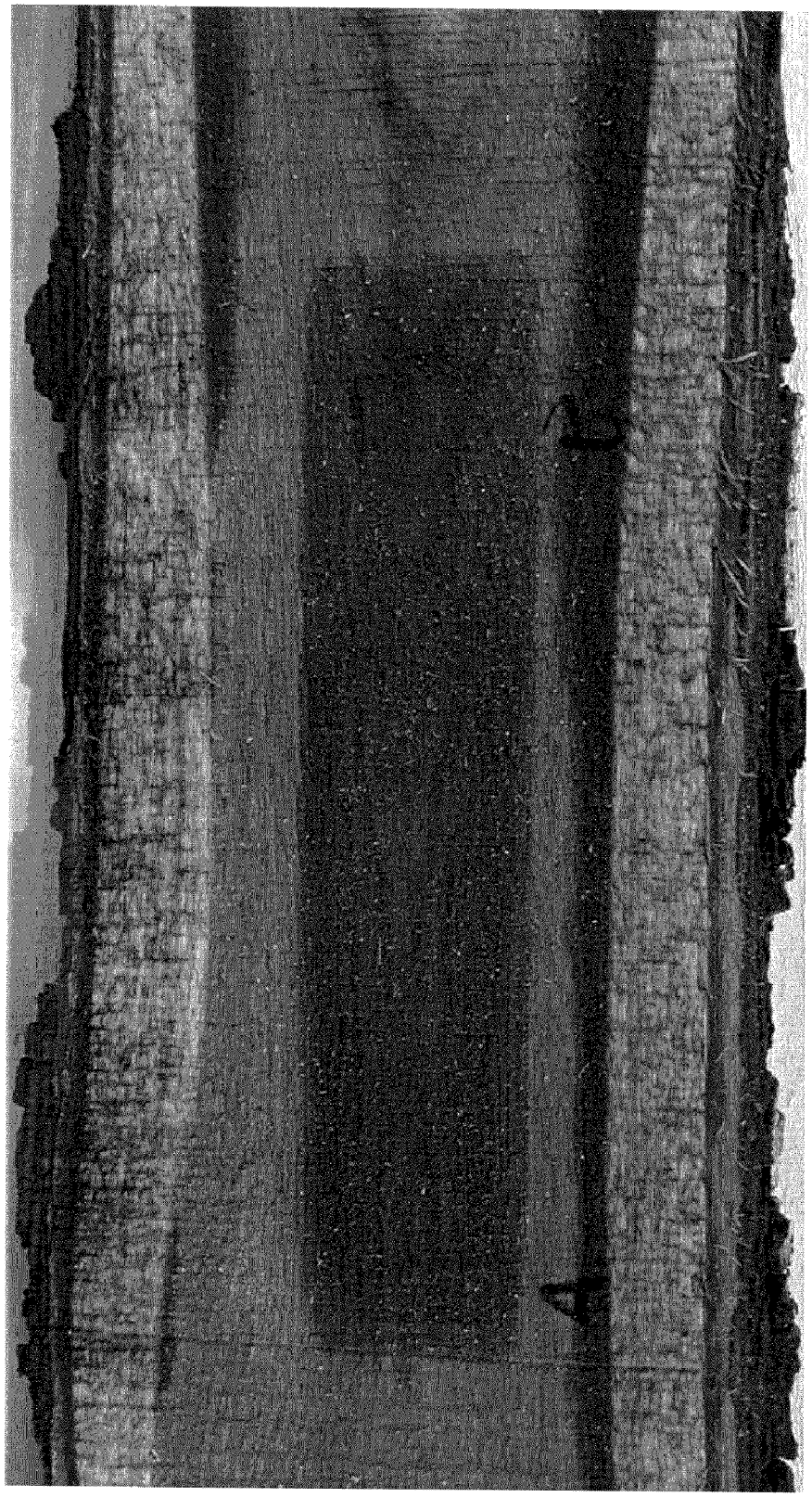
FIG. 4A is a black and white version of the photograph of FIG. 4.

FIG. 4 shows a photograph of a section of freshly cut black walnut wood. Four test strip applications were applied to the sample. The four test strips had concentrations, from left to right, 0, 0.05, 0.1, 0.5 and 1.0% (w:w) $CH_4N_2O*H_2O_2$. Note that the control spot (deionized water) shows no staining. The reaction shows a visible staining in the 0.5 and 1.0% concentration range. The concentration range indicates that this reaction is biochemically induced by signaling, and is not a bulk chemical reaction. It is believed that the induction of the signaling system initiated bio-oxidative staining in the wood under the test strip.

Figure 3A:
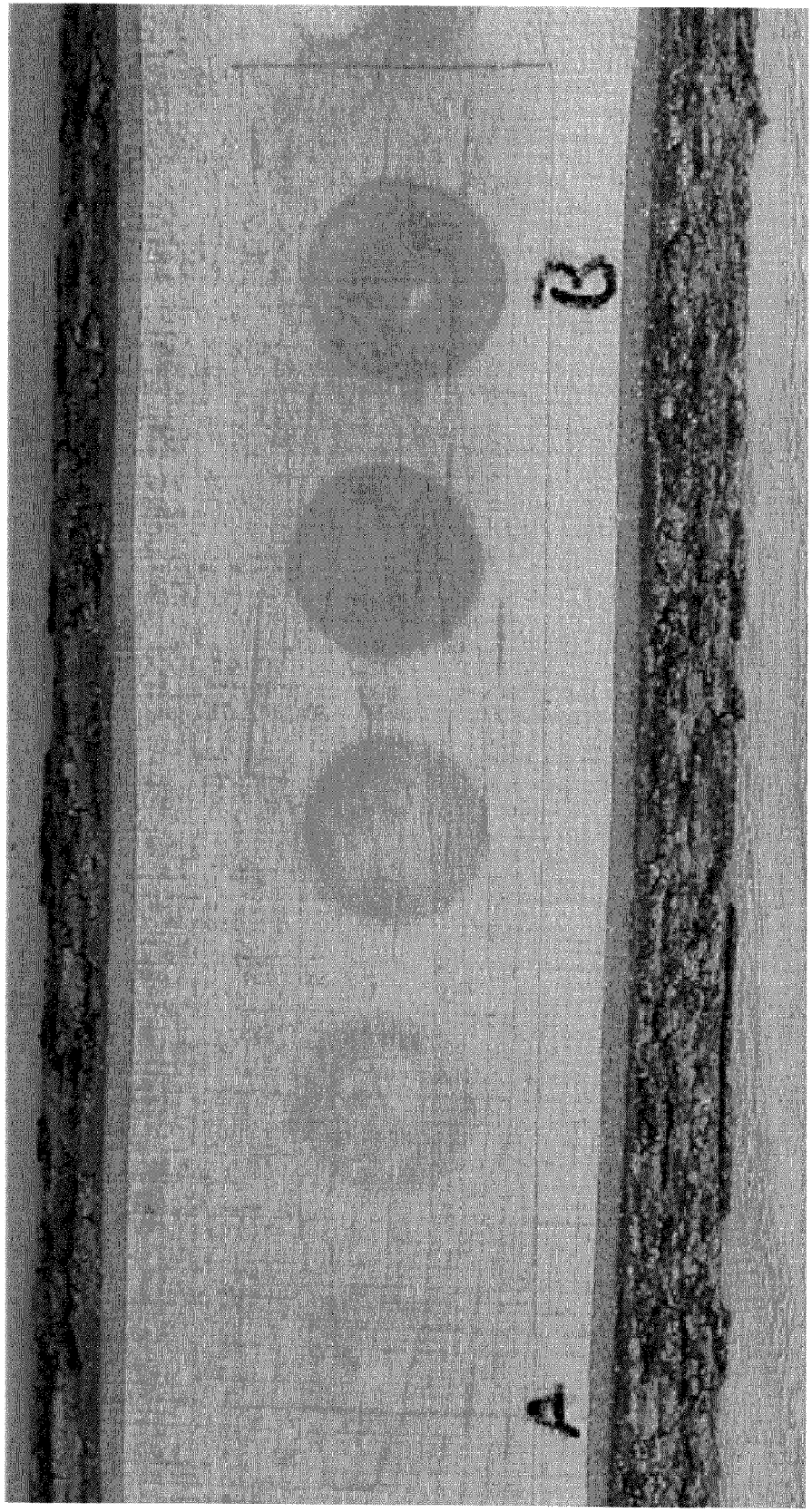
FIG. 3A is a black and white version of the photograph of FIG. 3.
Figure 5:
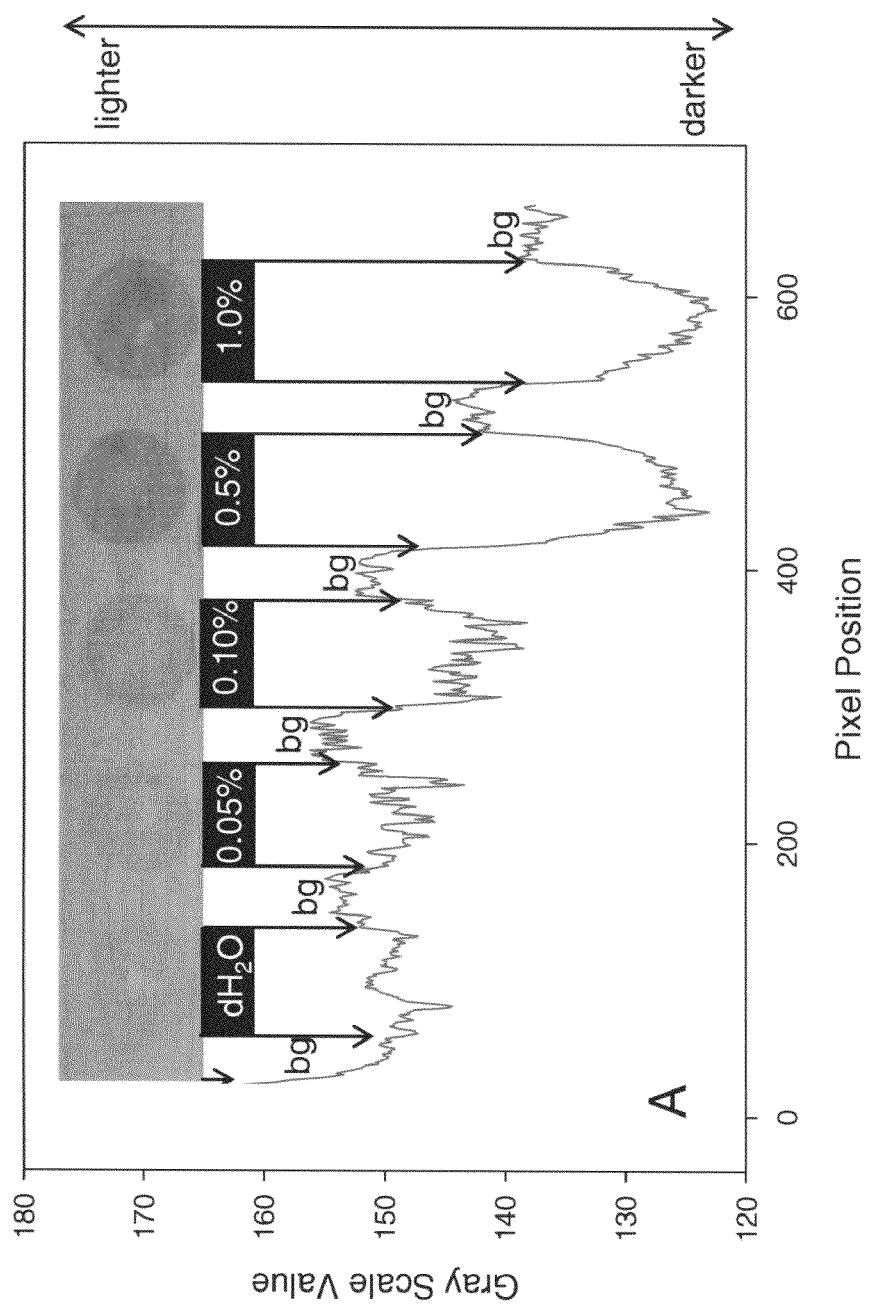
FIG. 5 is a dose response curve of the data in FIG. 3 and FIG. 3A.
Figure 6:
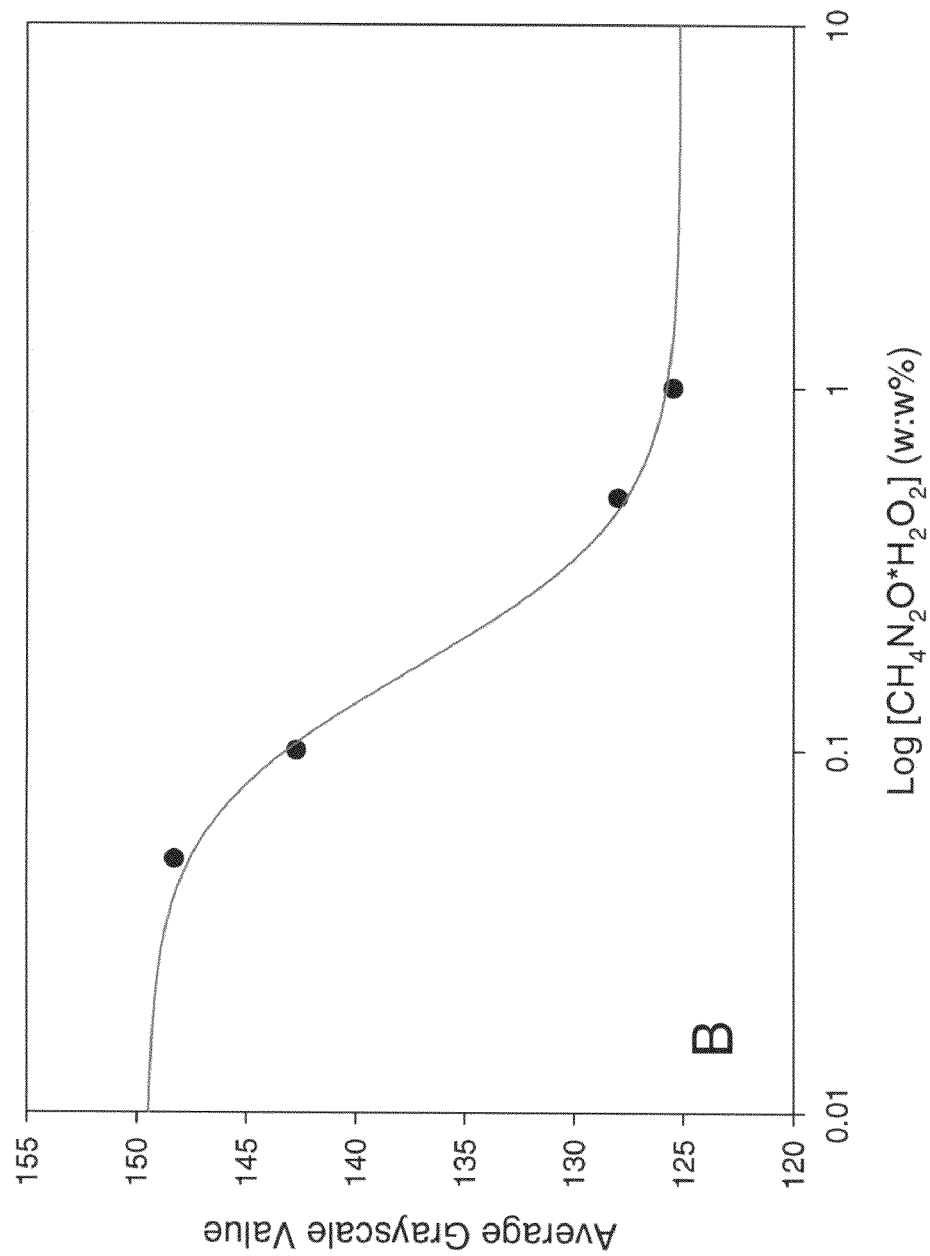
FIG. 6 is the standard curve analysis (Hillman plot) of the averaged data for each dose In FIG. 5.

FIG. 5 shows a dose response curve for the experiment shown in FIGS. 3 and 3A. The dose response curve was subject to image analysis using Image J software (open source). The region of interest was identified and is shown by the photograph within FIG. 5. The images from the photograph were quantified using the plot profile function of the Image J software. This yielded a plot of relative darkness (grayscale value) versus x-coordinate pixel position. The background gray scale values (bg) show an increase in wood darkening with increasing hydrogen peroxide urea adduct concentrations. This figure shows that cell-cell signaling is propagating through the wood causing darkening. The data corresponding to each of the treatment spots was averaged and analyzed using the Hillman method for standard curve analysis in FIG. 6. The resulting plot yielded an $R^2$ value of 0.9977 and an EC50 value of 0.1677% hydrogen peroxide urea adduct. The EC50 value is well understood in the biochemical arts. Here, with respect to the data generated in FIGS. 3, 3A, and 5, EC50 is the concentration of hydrogen peroxide urea addict which produces 50% of the maximum possible response, which here, is wood darkening.

In another embodiment of the invention, the cut wood may be treated with a solution containing a cell signaling agent inhibitor. In these embodiments of the invention, the color of wood is substantially preserved.

By "cell signaling agent inhibitor" what is meant is a material that prevents cell signaling in cut wood. Antioxidants, which may be any organic or synthetic molecule that is capable of reacting with free radicals and neutralizing them, are included within the definition of cell signaling agent inhibitors. Non-limiting examples of antioxidants within various embodiments of the invention include ascorbic acid (vitamin D), flavonoids, glutathione, and lipoic acid. By "substantially preserved" what is meant is that the color of untreated wood darkens at a perceptibly faster rate than that of treated wood under embodiments of the invention where a cell signaling agent inhibitor is used to treat wood.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for darkening the color of wood comprising treating a surface of wood with a solution containing a wood cell signaling agent in an amount effective to darken the color of the wood, wherein the wood cell signaling agent results in the wood generating compounds which darken the wood.
2. The method of claim 1 wherein the solution essentially consists of water and a cell signaling agent.
3. The method of claim 1 wherein the cell signaling agent is a reactive oxygen species.
4. The method of claim 3 wherein the reactive oxygen species includes at least one selected from the group consisting of molecular oxygen, hydrogen peroxide, superoxide anion, hydroxyl radical, hydroxyl ion, singlet oxygen, nitric oxide, and peroxynitrite.
5. The method of claim 3 wherein the reactive oxygen species is included with or obtained from a compound chosen from the group including urea, calcium peroxide, menadione, and any nitric oxide donor including sodium nitroprusside, S-nitrosoN-acetylpenicillamine, nitroglycerine, and any nonoate.
6. The method of claim 1 wherein said treating is at ambient conditions.
7. The method of claim 1 which further comprises removing the cell signaling agent after treating for a predetermined period of time less than about 60 minutes.
8. The method of claim 7 wherein the predetermined period is less than about 10 minutes.
9. The method of claim 1 wherein the removal of the solution is done by evaporation.
10. The method of claim 1 wherein the cell signaling agent is present in the solution at a weight percentage of about 10 percent or less.
11. The method of claim 10 wherein the cell signaling agent is present in the solution at a weight percentage of about 2 percent or less.
12. The method of claim 11 wherein the cell signaling agent is present in the solution at a weight percentage of about 0.05 percent or more.
13. The method of claim 1 wherein the solution comprises water and hydrogen peroxide.
14. The method of claim 13 wherein the solution comprises hydrogen peroxide at a weight percentage of about 10 percent or less.
15. The method of claim 1 which further comprises cutting the wood prior to said treating.
16. The method of claim 1 wherein the cell signaling agent activates an enzyme in the cells of the wood.
17. The method of claim 16 wherein the activated enzymes induce the darkening of the wood.
18. The method of claim 1 wherein the surface is a freshly cut surface.
19. The method of claim 1 which further comprises treating the wood prior to cutting the wood.
20. The method of claim 1 in which the amount of the solution does not substantially damage macromolecules of the cells.
21. The method of claim 3 wherein the reactive oxygen species includes a free radical that functions in the signaling processes of the wood cells.
22. The method of claim 3 wherein the reactive oxygen species is hydrogen peroxide.
23. A method for preserving the color of wood comprising treating a surface of wood with a solution containing cell signaling agent inhibitor in an amount effective to discourage signaling by wood cell agents that darken the color of the wood, wherein said inhibitor is at least one chosen from the group including flavonoids, glutathione, and lipoic acid.
24. The method of claim 23 which further comprises applying a solution containing a cell signaling agent in an amount effective to darken the color of the wood prior to said treating.
25. The method of claim 24 which further comprises cutting the wood prior to said applying.
26. The method of claim 23 wherein said treating is at ambient conditions.
27. The method of claim 23 wherein the inhibitor reacts with free radicals and neutralizes the free radicals.
28. The method of claim 23 wherein the surface is a freshly cut surface.
29. The method of claim 23 which further comprises treating the wood prior to cutting the wood.
30. The method of claim 23 wherein the inhibitor biochemically discourages signaling from enzymes.

* * * * *